(12) United States Patent
Liu et al.

(10) Patent No.: US 7,701,509 B2
(45) Date of Patent: Apr. 20, 2010

(54) MOTION COMPENSATED VIDEO SPATIAL UP-CONVERSION

(75) Inventors: Yuxin Zoe Liu, Mountain View, CA (US); Ragip Kurceren, Carrollton, TX (US)

(73) Assignee: Nokia Corporation, Espoo (FI)

(*) Notice: Subject to any disclaimer, the term of this patent is extended or adjusted under 35 U.S.C. 154(b) by 1030 days.

(21) Appl. No.: 11/411,700

(22) Filed: Apr. 25, 2006

(65) Prior Publication Data

US 2007/0247547 A1    Oct. 25, 2007

(51) Int. Cl.
 *H04N 7/01* (2006.01)
(52) U.S. Cl. ............................ 348/452; 348/448
(58) Field of Classification Search ............ 348/441, 348/448, 451, 452, 699–701, 458, 459; *H04N 7/01, H04N 11/20*
See application file for complete search history.

(56) References Cited

U.S. PATENT DOCUMENTS

| 6,433,828 | B1 | 8/2002 | Kondo et al. | |
| 7,542,095 | B2* | 6/2009 | Zhou et al. | 348/452 |
| 2006/0023119 | A1* | 2/2006 | Han | 348/452 |
| 2008/0122975 | A1* | 5/2008 | Winger et al. | 348/448 |

FOREIGN PATENT DOCUMENTS

| EP | 0 348 186 | 12/1989 |
| EP | 0735747 | 10/1996 |
| EP | 1006732 | 6/2000 |
| GB | 2 410 392 | 7/2005 |
| WO | WO 02/43400 | 5/2002 |

OTHER PUBLICATIONS

European Search Report for European Application No. 07106950.4 dated Jun. 29, 2009.
Haan et al., "Deinterlacing—An interview". Proceedings of the IEEE, IEEE. New York, vol. 86, No. 9, Sep. 1, 1998, pp. 1839-1857.
Gangwal et al., Understanding video pixel processing applications for flexible implementations. Proceedings of the Euromicro Symposium on Digital System Design (DSD'03), p. 392-401, 2003.
International Search Report for PCT Application No. PCT/IB2007/051516.

* cited by examiner

*Primary Examiner*—Sherrie Hsia
(74) *Attorney, Agent, or Firm*—Foley & Lardner, LLP

(57) ABSTRACT

A method for performing motion compensated video spatial up-conversion on video. The horizontal samples in successive fields are first interpolated using a spatial interpolation technique. This is followed by interpolating the corresponding vertical samples using a motion compensated deinterlacing technique. Such techniques can include an adaptively recursive motion compensated video spatial up-conversion or an adaptively recursive motion compensated video spatial up-conversion using a generalized sampling theorem. The present invention can be used to convert video captured on a mobile device, such as a mobile telephone, so that it can be subsequently and adequately displayed on a television.

14 Claims, 7 Drawing Sheets

FIG. 1(a)
FIG. 1(b)
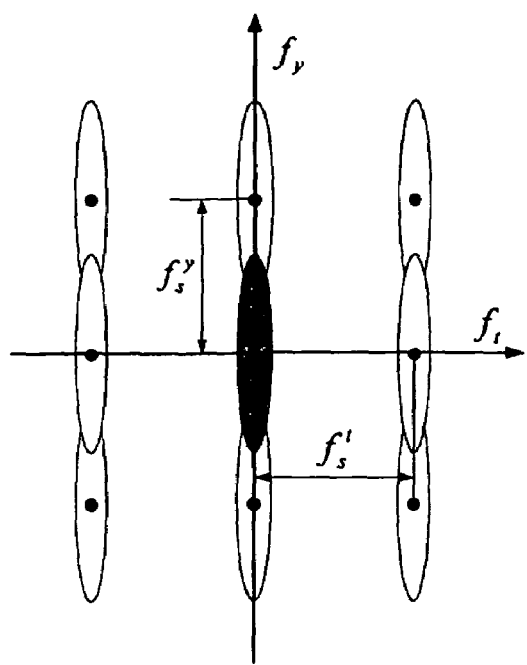
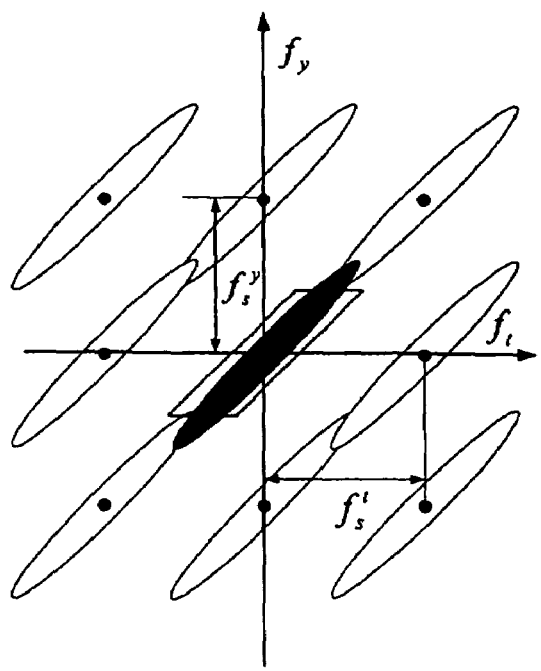

FIG. 4(a)   FIG. 4(b)
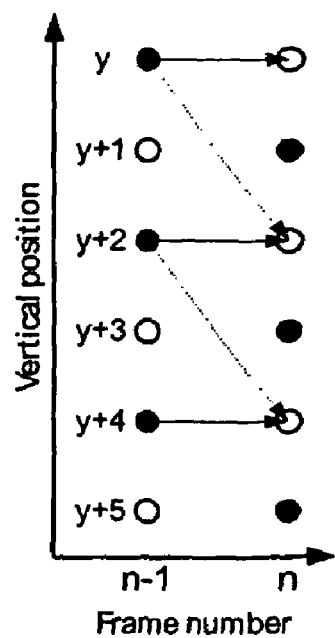
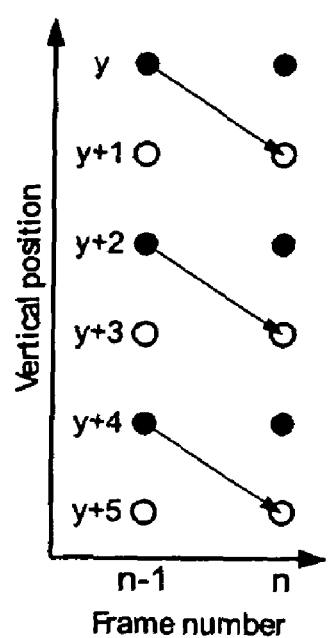
FIG. 5
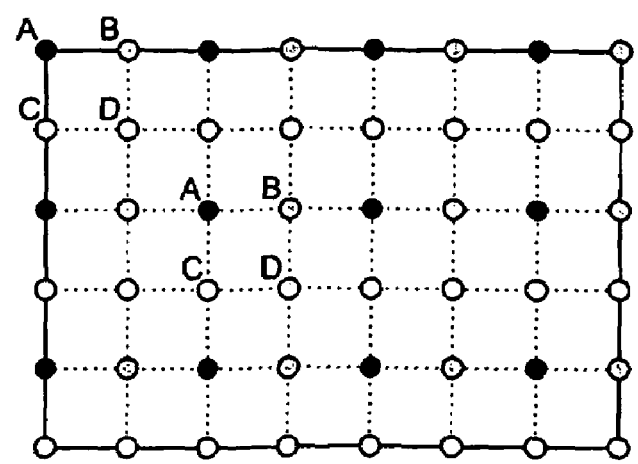

MOTION COMPENSATED VIDEO SPATIAL UP-CONVERSION

FIELD OF THE INVENTION

The present invention relates generally to video processing. More particularly, the present invention relates to video spatial-up conversion using motion compensation in video processing.

BACKGROUND OF THE INVENTION

Video spatial up-conversion (V-SUC) is also known as video resolution enhancement. V-SUC is used to enhance the spatial resolution of an arbitrary video sequence through both horizontal and vertical spatial interpolation. Video spatial up-conversion is one aspect of video format conversion (VFC), in which video signals are converted from one format to another. Two typical aspects of VFC are video deinterlacing, also known as video scan rate up-conversion and video picture rate up-conversion. Deinterlacing involves enhancing the spatial resolution of a video signal through interpolation in the vertical direction. Video picture rate up-conversion enhances the picture rate (also known as frame rate) of a video signal through temporal interpolation.

Video spatial up-conversion is required for TV-out of mobile phone captured videos. Typical spatial resolutions of NTSC TV are 640×480 or 800×576. In contrast, videos captured by conventional mobile telephones have a spatial resolution typically as SIF (320×240), CIF (352×288), or QCIF (176×144). Therefore, the spatial resolution needs to be enhanced before mobile telephone-captured videos are displayed in a regular TV device. Another example of video spatial up-conversion involves the display of standard definition TV (SDTV) signals in a high definition TV (HDTV) device.

Video spatial up-conversion mainly needs to fulfill two tasks in the process of spatial resolution enhancement: anti-aliasing and high spatial frequency generation to overcome the over-smoothness artifact.

A digital video signal is obtained through three-dimensional (3D) sampling of the original continuous video signal. For example, $\Delta x$, $\Delta y$, and T can denote the sampling distances in the horizontal direction, the vertical direction, and the temporal direction, respectively, which specify a 3D sampling grid. In this situation the Fourier spectrum of the digital video signal is the ensemble of multiple replications of the Fourier spectrum of the continuous video signal along the 3D sampling grid that is specified by the sampling frequencies, $f_s^x$, $f_s^y$, and $f_s^t$, where $f_s^x=1/(\Delta x)$, $f_s^y=1/(\Delta y)$, and $f_s^t=1/T$. The replication centered at the coordinates $(0,0,0)$ is referred to as the baseband spectrum. If the original continuous signal is band-limited and the maximum frequencies in the respective directions, denoted as $f_{max}^x$, $f_{max}^y$, and $f_{max}^t$ respectively, satisfy the following constraints, namely $f_{max}^x \leq f_s^x/2=1/(2\Delta x)$, $f_{max}^y \leq f_s^y/2=1/(2\Delta y)$, and $f_{max}^t \leq f_s^t/2=1//(2T)$, then the continuous signal can be completely recovered from its 3D samples. Ideal interpolation filtering then corresponds to all-pass the baseband spectrum and the other replications are zeroed-out. If the above constraints are violated, then adjacent spectral replications will overlap with each other, resulting in aliasing.

When a continuous video signal is sampled, anti-aliasing filtering is first applied so that all the frequencies that are larger than half of the respective sampling frequency are removed, avoiding the problem of aliasing. However, this is not the case for progressively scanned videos that are captured by cameras. It is known that sampling in both the vertical and temporal directions is part of the scanning format integrated with the camera. The desired anti-aliasing is therefore required in the optical path of the camera, which is extremely difficult and expensive to realize. Therefore, aliasing is usually present in the $f_y$-$f_t$ frequency space, as shown in FIG. 1. In the $f_y$-$f_t$ frequency space, the extent of the spectrum support is determined by the vertical details of the scene, while the spectrum orientation is determined by the vertical motions.

When a digital video signal is upsampled, an ideal interpolation filter should all-pass the baseband spectrum, without aliasing, while suppressing the aliasing portion as much as possible. As shown in FIG. 1(b), if a vertical motion is present, an ideal low pass filter for interpolation should be motion-compensated to effectively extract the baseband spectrum without aliasing.

In contrast, horizontal sampling is realized after the image acquisition process. For this reason, anti-aliasing filtering can be implemented in the horizontal direction before sampling. This implies that, for video spatial up-conversion, the interpolation in the horizontal direction and the vertical direction should be treated separately. Because the high frequency component is either filtered out in the process of sampling or suppressed due to aliasing in the process of upsampling, the video signal after spatial up-conversion is lacking the high frequency component, resulting in the blurring or over-smoothness of artifacts. Many spatial filters have been designed to boost the high frequency component during spatial interpolation.

Conventional techniques for video spatial up-conversion have been primarily realized through spatial interpolation in a frame-by-frame basis. For this reason, spatial interpolation techniques for 2D still images have been directly extended to the use for video signals, where correlation across different frames of a digital video has been completely ignored.

Spatial interpolation using finite impulse response (FIR) filtering is the most commonly used technique, where image independent FIR filters are applied in both the horizontal direction and vertical direction of a still image. Various interpolation FIR filters have been designed, with typical examples as bilinear filter, bicubic filter, bicubic spline filter, Gaussian filter, and Lanczos filter. These FIR filters are differentiated from each other mainly by different passband and stopband frequencies, as well as the length of the filter kernels. The design of these FIR filters mainly aims to all-pass the baseband spectrum containing no alias, suppress the aliasing spectrum component, and boost high frequencies to preserve image details such as edges. As we mentioned, proper anti-aliasing is usually applied prior to horizontal sampling but not in vertical sampling, it is suggested that different filters be used for horizontal interpolation and for vertical interpolation.

Image content-dependent filters have also been developed for image spatial interpolation. On such filter is referred to as the Wiener filter, which is a linear filter with a target at the least mean square error (MSE). The coefficients of these types of filters are derived from the local image content, thus adapting to the local image characteristics. Other image spatial interpolation techniques are also conventionally known. These techniques include New Edge-Directed Interpolation (NEDI), which uses the geometrical duality across different resolutions of the image content, and Adaptive Quadratic (AQua) image interpolation, which is based upon the optimal recovery theory and can be used to permit the interpolation of images by arbitrary factors. It has been shown that longer FIR filter kernels or image dependent filters are often preferred.

Nevertheless, for the techniques that use spatial interpolation for video spatial up-conversion in a frame-by-frame basis, the correlation along the motion trajectory in the temporal direction has been widely ignored. It is known that NEDI has been extended for the use of video spatial up-conversion by taking into account of motion compensation. However, this consideration of motion compensation is confined to a specific schematic framework. Additionally, motion compensation has been considered for "superresolution," a recently emerged application also aiming to enhance the spatial resolution of an arbitrary video signal. However, superresolution is considerably different from video spatial up-conversion in the sense that superresolution is targeted to generate one or a limited set of images from a given video sequence with enhanced spatial resolution. In contrast, video spatial up-conversion aims to enhance the spatial resolution of every picture in the video sequence. An effective video spatial up-conversion technique is only permitted to use a limited number of adjacent frames to enhance the resolution of current frame and the computational complexity should be kept reasonably low. Therefore, the concept of motion compensated video spatial up-conversion has not been extensively examined.

SUMMARY OF THE INVENTION

The present invention involves the designing of effective motion compensated video up-conversion techniques by taking advantage of the connection between video spatial up-conversion and video deinterlacing. Specifically, the present invention involves the idea that interpolation in the two spatial directions for video spatial up-conversion be treated differently, and motion compensated techniques be used for the interpolation in the vertical direction.

The present invention addresses the two primary tasks involved in the process of spatial resolution enhancement for video spatial up-conversion. In particular, the present invention addresses both anti-aliasing and high spatial frequency generation, which serves to overcome the over-smoothness artifact that would otherwise exist using conventional approaches. With the present invention, video resolution is enhanced by a scaling parameter of 2 in both the horizontal and the vertical directions.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1(a) is a representation of the $f_y$-$f_t$ frequency space for progressively scanned videos with vertical motion, and FIG. 1(b) is a representation of the $f_y$-$f_t$ frequency space for progressively scanned videos without vertical motion;

FIG. 4(a) is a representation showing an example of vertical interpolation using motion compensated samples with video deinterlacing, and FIG. 4(b) is a representation showing an example of vertical interpolation using motion compensated samples with video spatial up-conversion;

FIG. 5 is a representation of four types of samples in video spatial up-conversion;

DETAILED DESCRIPTION OF THE PREFERRED EMBODIMENTS

In the present invention, the close connection between video spatial up-conversion and video deinterlacing is addressed. This is significant because, once the resemblance between these two aspects of video format conversion (VFC) is clarified, the success in the area of video deinterlacing can be directly migrated to the area of video spatial up-conversion. In particular, motion compensated video up-conversion techniques can be easily developed by extending the respective motion compensated video deinterlacing algorithms.

A unique and significant characteristic of video signals is motion. Considering the correlation along the motion trajectory in the task of video spatial resolution enhancement is beneficial. Motion compensated video spatial up-conversion techniques, however, is even more advantageous than the consideration of such a correlation without using temporal correlations in constructing a spatial resolution enhanced video with a superior quality. This fact is supported by the advantages of motion compensation in video deinterlacing and the close connection between video spatial up-conversion and video deinterlacing.

The present invention involves the concept of designing effective motion compensated video up-conversion techniques by taking advantage of the connection between video spatial up-conversion and video deinterlacing. Specifically, the present invention involves the idea that interpolation in the two spatial directions for video spatial up-conversion be treated differently, and motion compensated techniques be used for the interpolation in the vertical direction. Video spatial up-conversion is required for TV-out of mobile visual content. With the rapid evolution in the merging of the mobile visual content service and the traditional TV business, effective video spatial up-conversion is becoming more demanding in the consumer electronics market.

For motion compensated video spatial up-conversion, accurate motion vectors are required. It should be noted that the motion for video predictive coding is different from the motion for video format conversion (VFC). In video predictive coding, the motion vectors of one block do not have to be correlated to that of adjacent blocks. For video format conversion, on the other hand, the true motion is supposed to be identified, where the motion vectors of adjacent blocks that belong to one object should be correlated to each other. Such motions can be obtained for video spatial up-conversion in a similar manner as the motion estimation operation implemented for video deinterlacing or video frame rate up-conversion. Motion compensated video spatial up-conversion techniques require more computational resources than non-motion compensated techniques due to the requirement of motion estimation. However, motion estimators are conventionally known and can be used for video deinterlacing. Therefore, the additional cost for motion estimation in video spatial up-conversion is limited.

Figure 2:
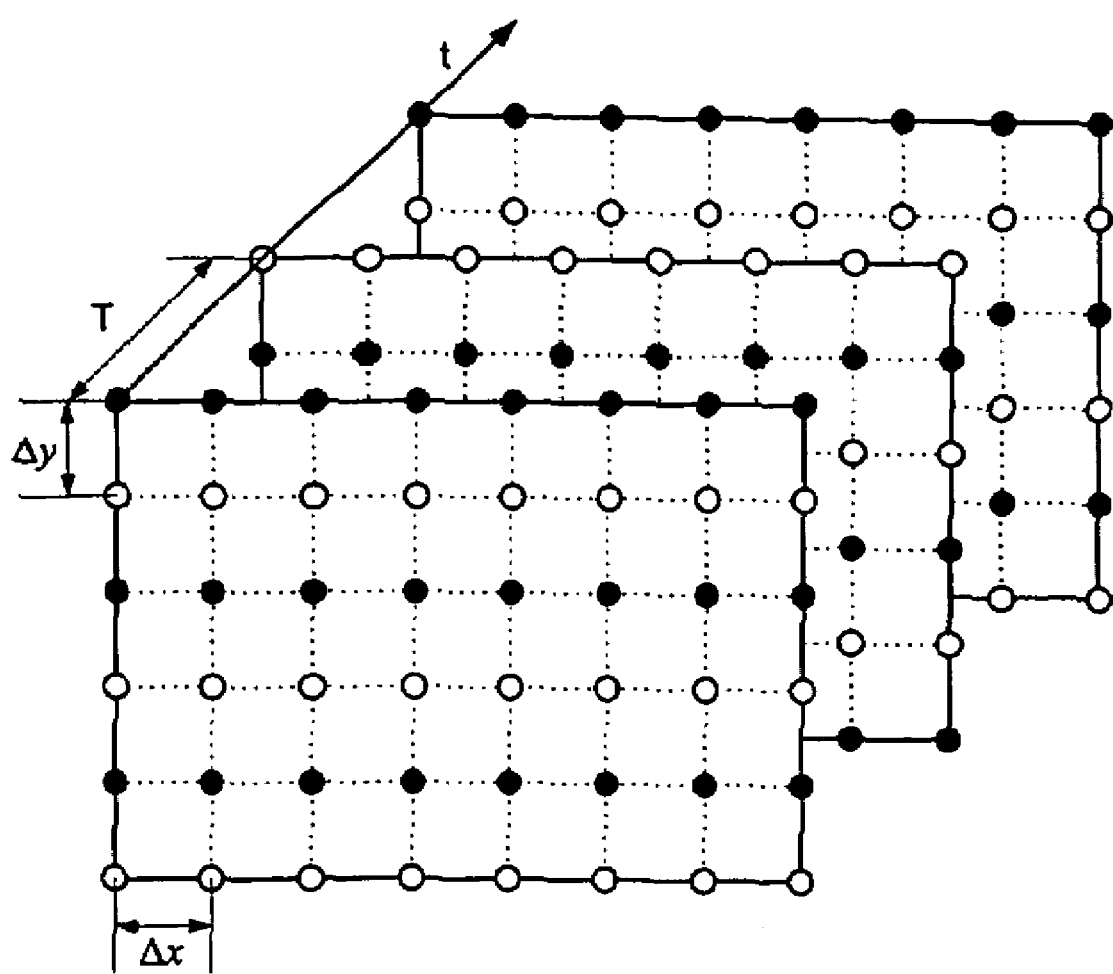
FIG. 2 is a representation of a three-dimensional sampling grid for video deinterlacing.

According to the present invention, video deinterlacing is used to enhance the video vertical resolution, as shown in FIG. 2. In contrast, video spatial up-conversion is used to enhance the video resolution both horizontally and vertically. This is represented in FIG. 3.

Figure 3:
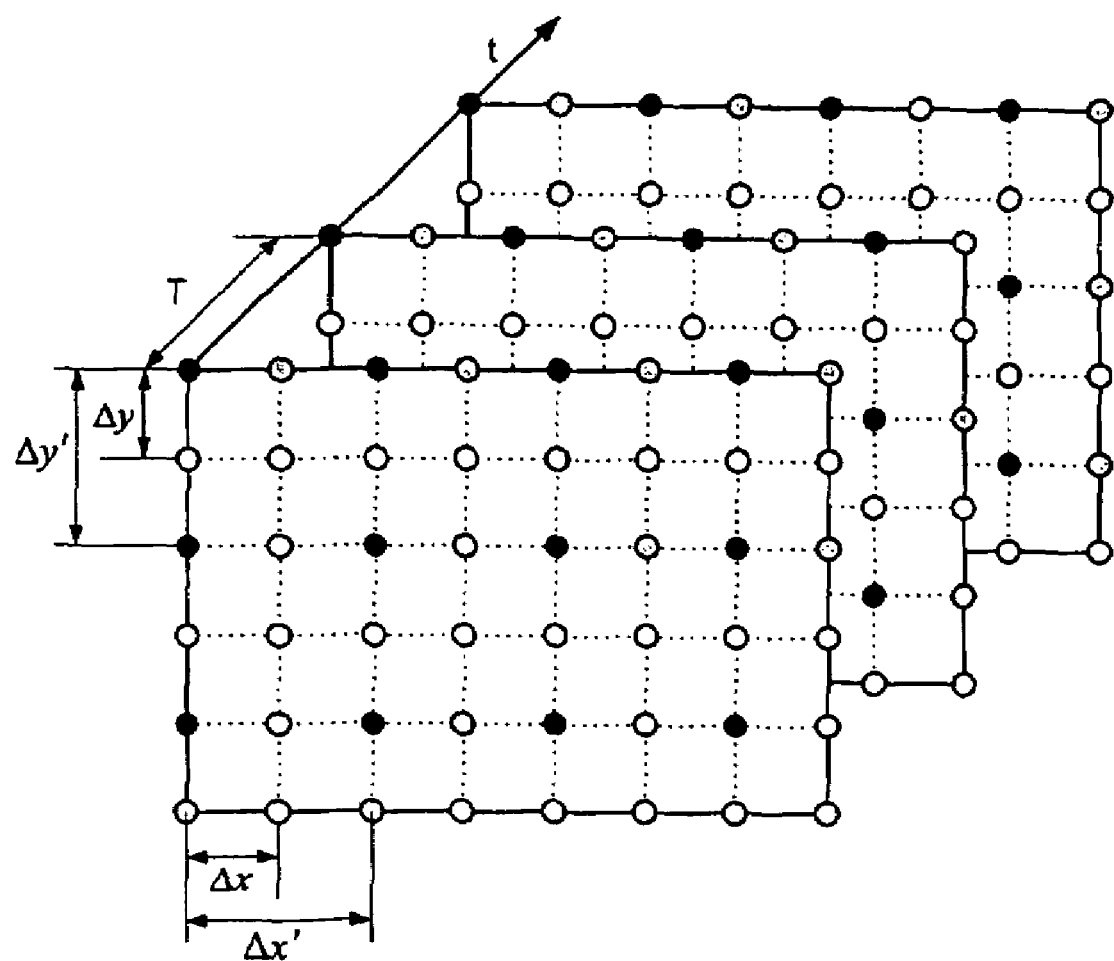
FIG. 3 is a representation a three-dimensional sampling grid for video spatial up-conversion.

As depicted in FIG. 3, for video spatial up-conversion, if the original video signal is sampled with spatial distances (Δx', Δy'), one can transform the 3D sampling grid to a grid with the same temporal sampling distance but with spatial sampling distances of Δx=Δx'/2 and Δy=Δy'/2, respectively. If the horizontal resolution is first enhanced, i.e., the horizontal samples are first interpolated through the use of FIR interpolation filtering, then the interpolated horizontal samples can be recursively used for the enhancement of the vertical resolution. Compared to the 3D sampling grid for interlaced videos in FIG. 2, the interpolation of vertical samples for video spatial up-conversion in FIG. 3 can be realized in a similar manner, except that the "original" vertical sampling lines in adjacent frames are located in the same positions for video spatial up-conversion, instead of being interlaced for the scenario of video deinterlacing. Therefore, a close connection between video spatial up-conversion and video deinterlacing is established from the 3D sampling grid perspective.

Motion compensated deinterlacing techniques take the motion compensated samples from the previous frame (or from both the previous and the successive frames) as a candidate for the interpolated samples of the current frame. It should be noted that, although the examples discussed herein refer specifically to frames, a variety of different types of fields, which may comprise frames, portions of frames, or other collections of information, may also be used in conjunction with the present invention. Due to the connection between video spatial up-conversion and video deinterlacing, a motion compensated video deinterlacing technique of the present invention should be able to be modified and extended for the use of video spatial up-conversion.

The following is a simple example showing the implementation of one embodiment of the present invention. For video deinterlacing as shown in FIG. 4(a), if a video signal only contains objects with a uniform vertical velocity of v=2kΔy/T, k∈Z, then the interpolated samples can be simply replaced by the motion compensated samples from the previous frame. Analogously, for video spatial up-conversion as shown in FIG. 4(b), if a video signal only contains a vertical velocity of v=(2k+1)Δy/T, k∈Z, then the interpolated samples can also be simply replaced by the motion compensated samples from the previous frame. As the role the operation of motion compensation plays in video deinterlacing, the use of motion compensation is also beneficial in video spatial up-conversion due to the consideration of temporal correlation along the motion trajectory of a video sequence.

Generally, methods for motion compensated video spatial up-conversion according to the present invention can be implemented through two steps. The first step involves interpolating the horizontal samples using a wide variety of spatial interpolation techniques. The second step involves interpolating the vertical sampling through the use of a motion compensated deinterlacing-like technique. The use of different methods for spatial interpolation in the horizontal direction and in the vertical direction is permissible because horizontal sampling is implemented after the image acquisition procedure, while vertical sampling is realized as a part of the image acquisition process by the cameras. The success of motion compensation in video deinterlacing, and the close connection between the two aspects of video format conversion (VFC), imply the success of motion compensation in video spatial up-conversion.

In different embodiments for implementing the process of the present invention, two video deinterlacing methods are selected. These methods have demonstrated particularly strong deinterlaced video quality. These methods are used to develop two motion compensated video spatial up-conversion techniques.

Algorithm I: Adaptively Recursive Motion Compensated Video Spatial Up-Conversion.

Extended from the Adaptive Recursive video deinterlacing technique, the following Adaptive Recursive Motion Compensated (ARMC) video spatial up-conversion technique can be implemented:

$$F_{SUC}(\vec{x}, n) = \begin{cases} \alpha_A(\vec{x}, n)F(\vec{x}, n) + (1 - \alpha_A(\vec{x}, n))F_{SUC} \\ \quad (\vec{x} - \vec{d}(\vec{x}, n), n-1), \\ \quad (x \bmod 2, y \bmod 2) = (0, 0) \\ \alpha_B(\vec{x}, n)F_{init}(\vec{x}, n) + (1 - \alpha_B(\vec{x}, n))F_{SUC} \\ \quad (\vec{x} - \vec{d}(\vec{x}, n), n-1), \\ \quad (x \bmod 2, y \bmod 2) = (1, 0) \\ \alpha_C(\vec{x}, n)F_{init}(\vec{x}, n) + (1 - \alpha_C(\vec{x}, n))F_{SUC} \\ \quad (\vec{x} - \vec{d}(\vec{x}, n), n-1), \\ \quad (x \bmod 2, y \bmod 2) = (0, 1) \\ \alpha_D(\vec{x}, n)F_{init}(\vec{x}, n) + (1 - \alpha_D(\vec{x}, n))F_{SUC} \\ \quad (\vec{x} - \vec{d}(\vec{x}, n), n-1), \\ \quad (x \bmod 2, y \bmod 2) = (1, 1) \end{cases} \quad (1)$$

$F(\vec{x}, n)$ denotes the original sample, $F_{init}(\vec{x}, n)$ denotes the initially interpolated sample, and $F_{SUC}(\vec{x}, n)$ denotes the ultimately interpolated sample after video spatial up-conversion, respectively, all at discrete spatial coordinates $\vec{x} = (x,y)^T$ and temporal coordinate n. $(\cdot)^T$ denotes the transpose of a vector/matrix. The four types of coordinates in the 3D sampling grid, as shown in FIG. 5, are indicated by "A" for (x mod 2, y mod 2)=(0,0), "B" for (x mod 2, y mod 2)=(1,0), "C" for (x mod 2,y mod 2)=(0,1), and "D" for (x mod 2,y mod 2)=(1,1). $\vec{d}(\vec{x},n)=(d_x(\vec{x},n), d_y(\vec{x},n))^T$ denotes the motion vector of the sample located in $(\vec{x},n)$.

Any spatial interpolation technique can be used for generating the initially interpolated samples $F_{init}(\vec{x}, n)$ at locations B, C, and D. Different FIR filters can be selected for the interpolation of horizontal samples (B) and vertical samples (C and D).

$\alpha_A(\vec{x}, n)$ is determined by the reliability of the motion vector for the original sample A:

$$\alpha_A(\vec{x}, n) = CLIP\left(0, c\sqrt{|F(\vec{x},n) - F_{SUC}(\vec{x} - \vec{d}(\vec{x},n), n-1)|}, 1\right) \quad (2)$$

where $CLIP(m_1, a, m_2) = \begin{cases} a & m_1 \le a \le m_2 \\ m_1 & a < m_1 \\ m_2 & a > m_2 \end{cases}$ and $c$ is scalar.

$\alpha_B(\vec{x}, n)$ is selected in a way such that the non-stationary pixels along the motion trajectory for sample B is the same as that of its horizontally neighboring pixels after video spatial up-conversion:

$$\alpha_B(\vec{x}, n) = CLIP\left(0, \frac{|\beta_{B1} + \beta_{B2}|/2 + \delta}{|F_{init}(\vec{x}, n) - F_{SUC}(\vec{x} - \vec{d}(\vec{x}, n), n - 1)| + \delta}, 1\right) \quad (3)$$

In Equation (3), $\delta$ is a small constant preventing division by zero, and $$\vec{\mu}_x = (1,0)^T,$$

$$\beta_{B1} = |F(\vec{x} - \vec{\mu}_x, n) - F_{SUC}(\vec{x} - \vec{\mu}_x - \vec{d}(\vec{x}, n), n-1)|,$$

$$\beta_{B2} = |F(\vec{x} + \vec{\mu}_x, n) - F_{SUC}(\vec{x} + \vec{\mu}_x - \vec{d}(\vec{x}, n), n-1)|.$$

$\alpha_C(\vec{x}, n)$ is selected in a way such that the non-stationary pixels along the motion trajectory for sample C is the same as that of its vertically neighboring pixels after video spatial up-conversion:

$$\alpha_C(\vec{x}, n) = CLIP\left(0, \frac{|\beta_{C1} + \beta_{C2}|/2 + \delta}{|F_{init}(\vec{x}, n) - F_{SUC}(\vec{x} - \vec{d}(\vec{x}, n), n - 1)| + \delta}, 1\right) \quad (4)$$

In Equation (4), $\delta$ is a small constant preventing division by zero, and $$\vec{\mu}_y = (1,0)^T,$$

$$\beta_{C1} = |F(\vec{x} - \vec{\mu}_y, n) - F_{SUC}(\vec{x} - \vec{\mu}_y - \vec{d}(\vec{x}, n), n-1)|,$$

$$\beta_{C2} = |F(\vec{x} + \vec{\mu}_y, n) - F_{SUC}(\vec{x} + \vec{\mu}_y - \vec{d}(\vec{x}, n), n-1)|.$$

$\alpha_D(\vec{x}, n)$ is selected in a way such that the non-stationary pixels along the motion trajectory for sample D is the same as that of its four diagonally neighboring pixels after video spatial up-conversion:

$$\alpha_D(\vec{x}, n) = CLIP\left(0, \frac{|\beta_{D1} + \beta_{D2} + \beta_{D3} + \beta_{D4}|/4 + \delta}{|F_{init}(\vec{x}, n) - F_{SUC}(\vec{x} - \vec{d}(\vec{x}, n), n - 1)| + \delta}, 1\right) \quad (5)$$

In Equation (5), $\delta$ is a small constant preventing division by zero, and $$\beta_{D1} = |F(\vec{x} - \vec{\mu}_x - \vec{\mu}_y, n) - F_{SUC}(\vec{x} - \vec{\mu}_x - \vec{\mu}_y - \vec{d}(\vec{x}, n), n-1)|,$$

$$\beta_{D2} = |F(\vec{x} + \vec{\mu}_x - \vec{\mu}_y, n) - F_{SUC}(\vec{x} + \vec{\mu}_x - \vec{\mu}_y - \vec{d}(\vec{x}, n), n-1)|,$$

$$\beta_{D3} = |F(\vec{x} - \vec{\mu}_x + \vec{\mu}_y, n) - F_{SUC}(\vec{x} - \vec{\mu}_x + \vec{\mu}_y - \vec{d}(\vec{x}, n), n-1)|,$$

$$\beta_{D4} = |F(\vec{x} + \vec{\mu}_x + \vec{\mu}_y, n) - F_{SUC}(\vec{x} + \vec{\mu}_x + \vec{\mu}_y - \vec{d}(\vec{x}, n), n-1)|.$$

Algorithm II: Adaptively Recursive Video Spatial Up-Conversion Using a Generalized Sampling Theorem (GST).

A continuous band-limited signal with a maximum frequency $f_{max}$ can be completely recovered from its discrete samples with a sampling frequency of at least $f_s = 2f_{max}$. The generalized sampling theorem (GST), developed by Yen in 1956, has shown that any band-limited signal with a maximum frequency $f_{max}$ can be completely recovered from its N disjoint sets of discrete samples, with each set obtained with a sampling frequency of at least $f_s = 2f_{max}/N$. In this situation, the "disjointness" refers to a shift in the time/spatial domain or equivalently, a phase difference in the frequency domain.

Figure 6:
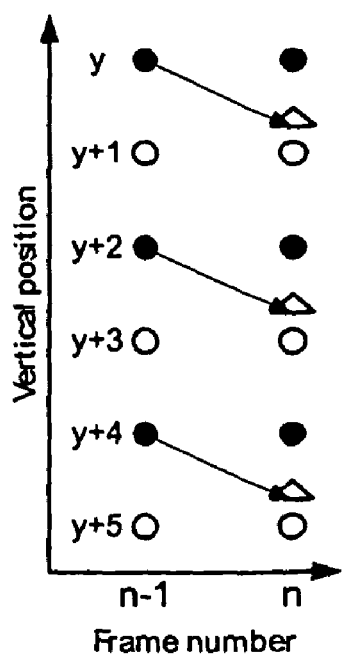
FIG. 6 is a representation of motion compensated interpolation using the Generalized Sampling Theorem (GST)

As shown in FIG. 6, where only the interpolation in the vertical direction is considered, two disjoint sets of samples are available for the interpolation of high-resolution samples in frame n, as long as the vertical component of the motion vector does not equal to 2k, $k \in Z$. One set is composed of the original samples in frame n, and the other set is composed of the motion compensated samples from frame (n−1). If the maximum vertical frequency satisfies $f_{max}^y \leq 2f_s^y/2 = f_s^y$, then the original continuous signal can be exactly recovered from the two sets of samples, and the interpolated samples can be further obtained by resampling of the reconstructed signal. This is the basic idea of using GST in interpolation.

GST has been successfully used in video deinterlacing. Extended from the known deinterlacing algorithm Adaptive Recursive GST, the following Adaptive Recursive Motion Compensated scheme using GST (ARMC-GST) can be used for video spatial up-conversion. ARMC-GST is a two-step algorithm. The first step involves horizontal interpolation. An Optimized FIR filter is designed for the interpolation in the horizontal direction, which is a 1D interpolation problem that conventionally understood. Through horizontal interpolation, samples at B positions are obtained. The second step involves vertical interpolation. Vertical interpolation is implemented as follows to obtain samples at C and D positions:

$$F_{SUC}(\vec{x}, n) = \begin{cases} \alpha_C(\vec{x}, n) F_{init}(\vec{x}, n) + (1 - \alpha_C(\vec{x}, n)) F_{GST} \\ (\vec{x}, n), (x \bmod 2, y \bmod 2) = (0, 1) \\ \alpha_D(\vec{x}, n) F_{init}(\vec{x}, n) + (1 - \alpha_D(\vec{x}, n)) F_{GST} \\ (\vec{x}, n), (x \bmod 2, y \bmod 2) = (1, 1) \end{cases} \quad (6)$$

In equation (6), $\alpha_C(\vec{x}, n)$ is obtained by Equation (4), $\alpha_D(\vec{x}, n)$ is obtained by Equation (5), $F_{init}(\vec{x}, n)$ is obtained by any spatial interpolation technique, and $$F_{GST}(\vec{x}, n) = \sum_k F(\vec{x} - (2k+1)\vec{\mu}_y, n) h_1(k, d_y(\vec{x}, n)) + \quad (7)$$
$$\sum_m F_{SUC}(\vec{x} - \vec{d}(\vec{x}, n) - (2m+1)\vec{\mu}_y, n-1)$$
$$h_2(m, d_y(\vec{x}, n))$$

In Equation (7), $h_1(k, d_y(\vec{x}, n))$ and $h_2(m, d_y(\vec{x}, n))$, $k, m \in Z$, are two FIR filters in the vertical direction as a function of the vertical component of the motion vector. The FIR filters can be designed in exactly the same way as their design in video deinterlacing using GST. As designated by the references, it is known that, in recovering a continuous signal from its two sets of disjoint samples, if the condition $f_{max}^y \leq 2f_s^y/2 = f_s^y$ is satisfied, aliasing for each set of samples is caused only by the interference of the two adjacent spectral replications. The spectrum of the original continuous signal can therefore be expressed in closed from as a linear combination of the spectrums of the two set of samples with complex weights. The interpolated samples are then obtained through resampling of the reconstructed continuous signal.

Figure 7:
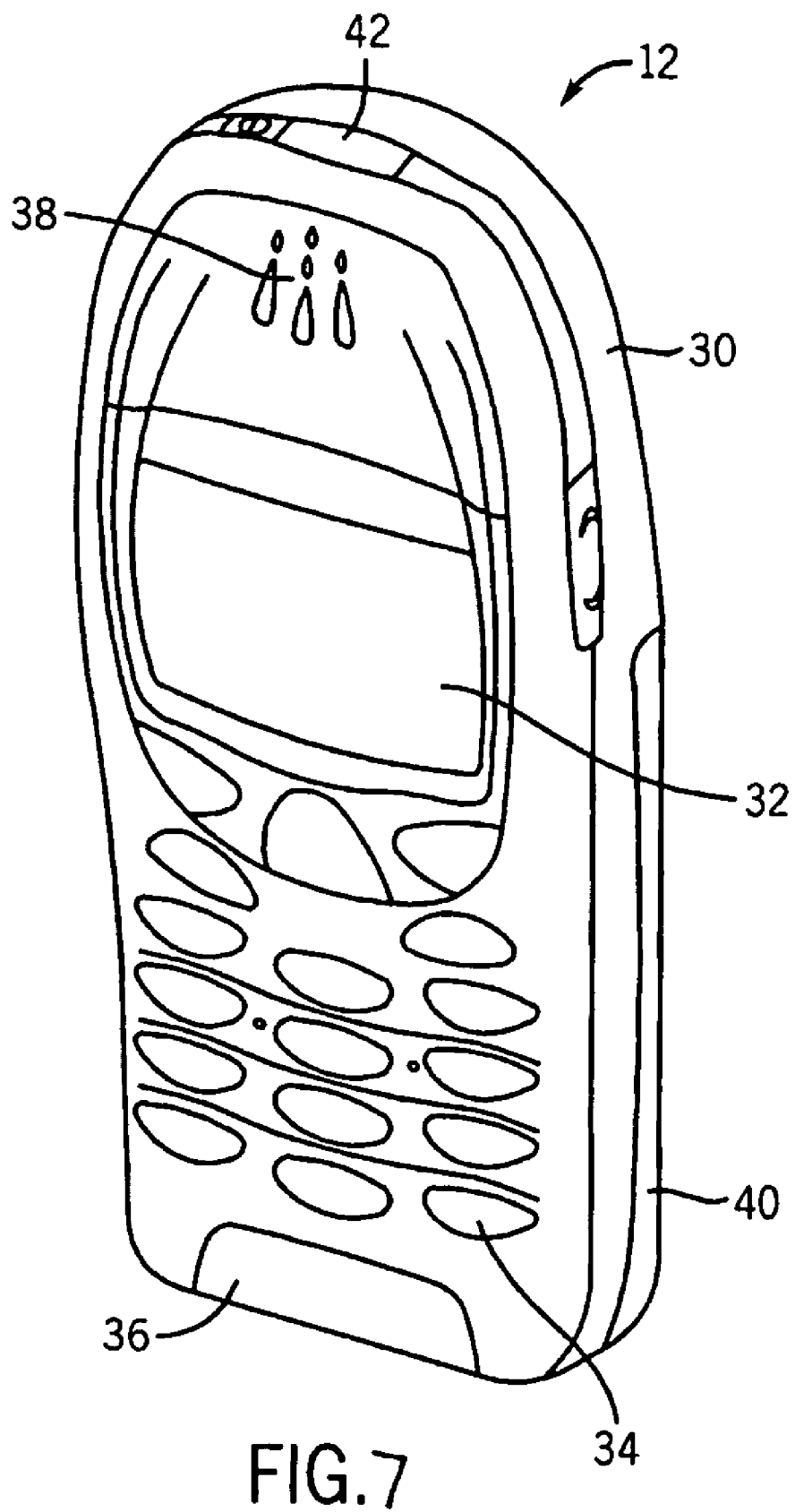
FIG. 7 is a perspective view of an electronic device that can incorporate the principles of the present invention.
Figure 8:
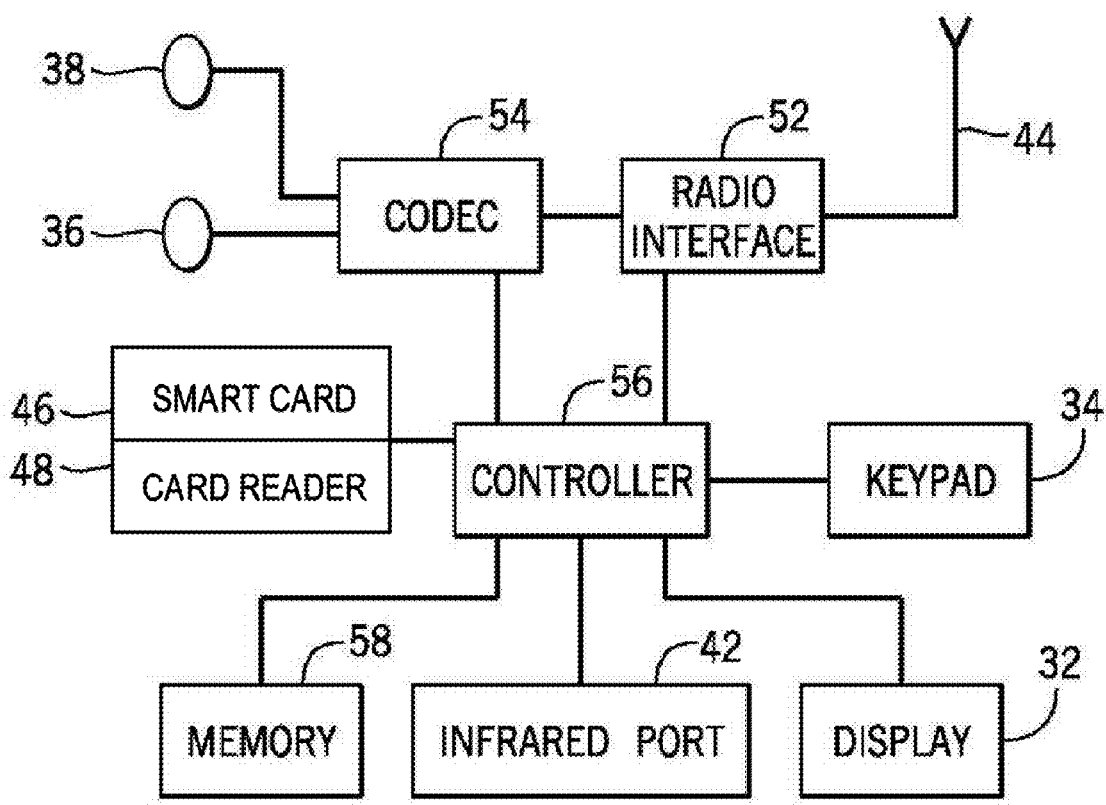
FIG. 8 is a schematic representation of the circuitry of the electronic device of FIG. 7.

FIGS. 7 and 8 show one representative electronic device 12 upon which the present invention may be implemented. The electronic device 12 shown in FIGS. 7 and 8 comprises a mobile telephone. However, it is important to note that the present invention is not limited to any type of electronic device and could be incorporated into devices such as personal digital assistants, personal computers, integrated messaging devices, and a wide variety of other devices. It should be understood that the present invention could be incorporated on a wide variety of electronic device 12.

The electronic device 12 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. It should be noted that the controller 56 can be the same unit or a different unit than the camera processor 116. The memory 58 may or may not be the same component as the primary memory unit 114 in various embodiments of the present invention. Individual circuits and elements are all of a type well known in the art, for example in the Nokia range of mobile telephones.

The present invention can be implemented as a part of a TV-out system for mobile terminals. Such a system can permit a user to display videos captured by a handset in a separate TV device.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for performing motion compensated video spatial up-conversion on video comprising first and second fields, each of the first and second fields including a plurality of horizontal samples and a plurality of vertical samples, comprising:
    interpolating the plurality of horizontal samples in the first field and the second field using a spatial interpolation technique; and
    interpolating the plurality of vertical samples in the first field and the second field using a motion compensated deinterlacing technique, the motion compensated deinterlacing technique comprising at least one of an adaptively recursive motion compensated video spatial up-conversion and an adaptively recursive video spatial up-conversion using a generalized sampling theorem.

2. The method of claim 1, wherein an optimized finite impulse response filter is used in the interpolation of the plurality of horizontal samples.

3. The method of claim 1, wherein at least one optimized finite impulse response filter is used in the interpolation of the plurality of vertical samples.

4. The method of claim 1, wherein the video is captured by a mobile device, and further comprising displaying the video on a television after the plurality of horizontal samples and the plurality of vertical samples have been interpolated.

5. The method of claim 1, wherein the video is intended for a non-high definition television, and further comprising displaying the video on a high definition television after the plurality of horizontal samples and the plurality of vertical samples have been interpolated.

6. A computer program product for performing motion compensated video spatial up-conversion on video comprising first and second fields, each of the first and second fields including a plurality of horizontal samples and a plurality of vertical samples, comprising:
    computer code for interpolating the plurality of horizontal samples in the first field and the second field using a spatial interpolation technique; and
    computer code for interpolating the plurality of vertical samples in the first field and the second field using a motion compensated deinterlacing technique, the motion compensated deinterlacing technique comprising at least one of an adaptively recursive motion compensated video spatial up-conversion and an adaptively recursive video spatial up-conversion using a generalized sampling theorem.

7. The computer program product of claim 6, wherein an optimized finite impulse response filter is used in the interpolation of the plurality of horizontal samples.

8. The computer program product of claim 6, wherein at least one optimized finite impulse response filter is used in the interpolation of the plurality of vertical samples.

9. The computer program product of claim 6, wherein the video is captured by a mobile device, and further comprising computer code for displaying the video on a television after the plurality of horizontal samples and the plurality of vertical samples have been interpolated.

10. The computer program product of claim 6, wherein the video is intended for a non-high definition television, and further comprising displaying the video on a high definition television after the plurality of horizontal samples and the plurality of vertical samples have been interpolated.

11. An electronic device, comprising:
    a processor; and
    a memory unit operatively connected to the processor and including a computer program product for performing motion compensated video spatial up-conversion on video comprising first and second fields, each of the first and second fields including a plurality of horizontal samples and a plurality of vertical samples, the computer program product comprising:

computer code for interpolating the plurality of horizontal samples in the first field and the second field using a spatial interpolation technique; and computer code for interpolating the plurality of vertical samples in the first field and the second field using a motion compensated deinterlacing technique, the motion compensated deinterlacing technique comprising at least one of an adaptively recursive motion compensated video spatial up-conversion and an adaptively recursive video spatial up-conversion using a generalized sampling theorem.

12. The electronic device of claim 11, wherein an optimized finite impulse response filter is used in the interpolation of the plurality of horizontal samples.

13. The electronic device of claim 11, wherein at least one optimized finite impulse response filter is used in the interpolation of the plurality of vertical samples.

14. The electronic device of claim 11, wherein the electronic device comprises a mobile telephone.

* * * * *